Dec. 16, 1952   B. C. FLEMING-WILLIAMS   2,622,240
RADAR APPARATUS
Filed Oct. 3, 1949   2 SHEETS—SHEET 2
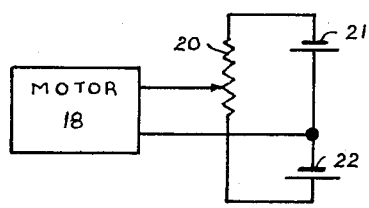
*Fig. 2.*
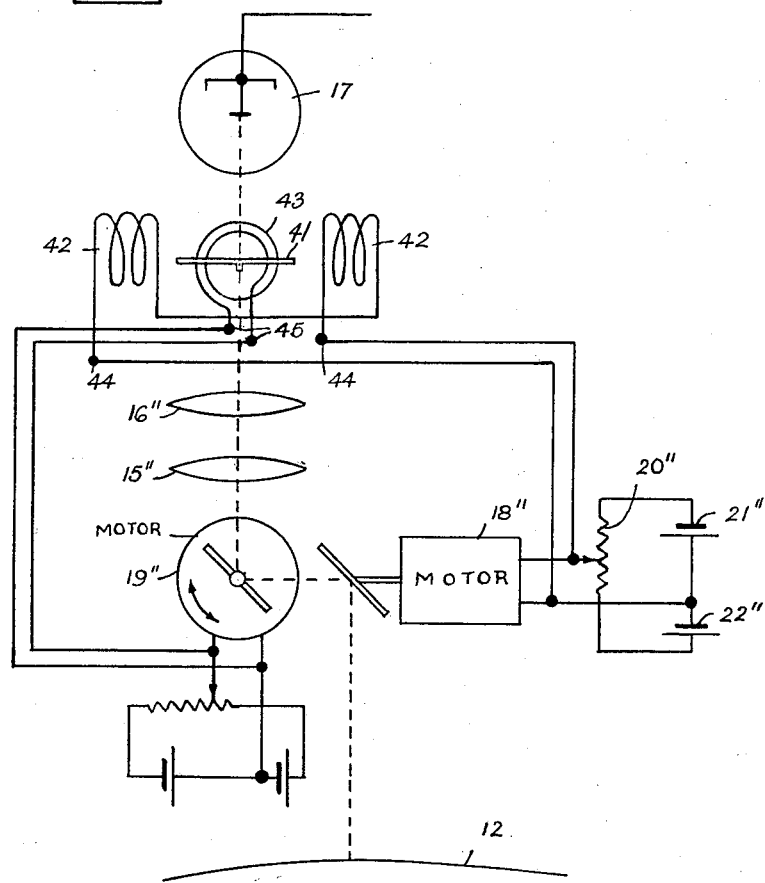
*Fig. 3.*
*Fig. 4.*
INVENTOR
Brian C. Fleming-Williams
By Ralph B. Stewart
Attorney Patented Dec. 16, 1952

2,622,240

UNITED STATES PATENT OFFICE 2,622,240

RADAR APPARATUS

Brian Clifford Fleming-Williams, London, England, assignor to A. C. Cossor Limited, London, England, a company of Great Britain Application October 3, 1949, Serial No. 119,316
In Great Britain October 7, 1948

8 Claims. (Cl. 343—5)

The present invention relates to radar apparatus of the kind in which there is produced on a screen a two-dimensional representation of features scanned by the radar aerial system which features are capable of returning echo signals of sufficient intensity to the radar aerial system.

When a number of moving objects, such for example as aircraft, are amongst the features represented on the radar screen, means are usually provided for the rapid identification of individual screen indications representing such features. However, even if only two such indications have been identified amongst many, it is often difficult to maintain the identifications during their passage over the screen without further recourse to the identification means. To maintain the identity of three or more indications is virtually impossible with methods at present in use.

The present invention has for its object to overcome or greatly reduce this difficulty.

According to the invention, radar apparatus comprises a main cathode ray tube on the screen of which the radar representation is to appear, an auxiliary cathode ray tube, means for deflecting the cathode ray beams in the two tubes in synchronism with one another (although not necessarily to the same extents) to scan the screens of the respective tubes, an optical system for directing light from a zone of the screen of the auxiliary tube, which zone has an area which is a small fraction of the total area of the screen of this tube, upon a representation of a symbol (which is to constitute an identifying mark) to scan this symbol, a photo-electric cell for collecting light resulting from the scanning of the symbol, means for appying a voltage derived from the photo-electric cell to modulate the intensity of the beam in the main cathode ray tube, and means whereby the position of the said zone upon the screen of the auxiliary tube can be adjusted to be approximately that corresponding to the position of the indication upon the screen of the main tube which indication is to be identified by the symbol.

The invention will be described by way of example with reference to the accompanying drawings, in which:

Figure 2 is a circuit diagram of the motor control arrangement that may be used in the embodiment of Figure 1, Figure 3 shows an additional feature of the invention, and Figure 4 shows forms which the identifying symbols may take.

Figure 1:
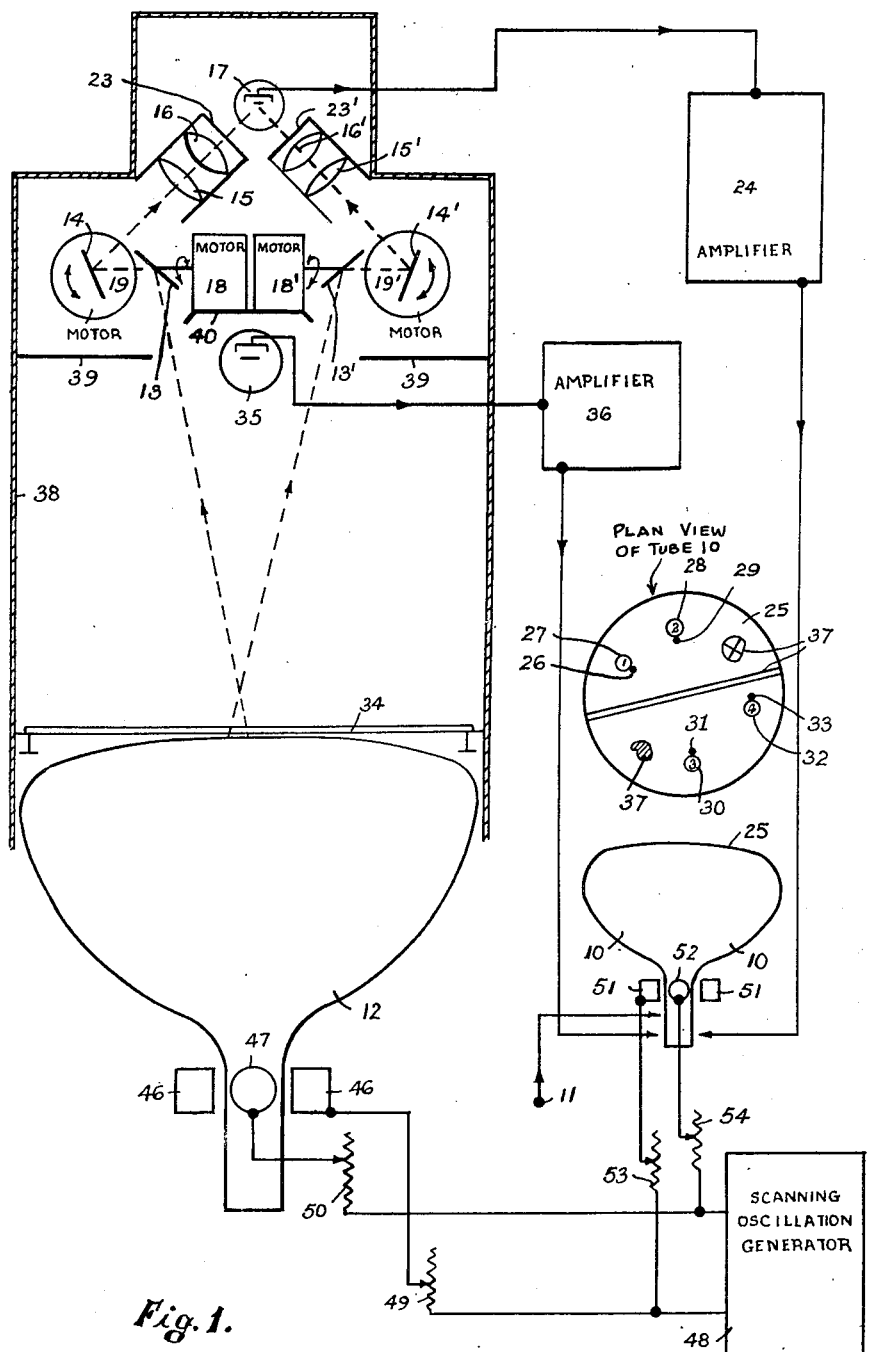
Figure 1 is a diagrammatic representation of one embodiment.

In the embodiment to be described, it will be assumed that the presentation is by plan position indicator (P. P. I.) It is to be understood, however, that other forms of two-dimensional presentation may be adopted.

Referring to Figure 1, a P. P. I. cathode ray tube 10 has radar signals applied at terminal 11 to a control electrode of the tube to control the intensity of the cathode ray beam in known manner. Thus according to the sense of the signals they may be applied to the control grid or cathode. An auxiliary cathode ray tube 12 is also provided and its cathode ray beam is unmodulated and is employed, in a manner to be described, as a scanning beam. The tube 12 should have a screen of low persistence whereas screen 25 of the tube 10 should be of relatively long persistence. The beam in the cathode ray tube 12 is arranged to be deflected in the same manner and in synchronism with the beam in the tube 10, although the amplitudes of the deflecting fields in the two tubes may be the same or different according to requirements. As shown, the tube 12 has deflecting coils 46 and 47 fed from a synchronising oscillation generator 48, the current in the coils being adjustable by means of rheostats 49 and 50 respectively. The tube 10 has deflecting coils 51 and 52 fed from the same generator 48 and the currents are adjustable by rheostats 53 and 54. The two tubes 10 and 12 may be of the same or different size. Light from a small zone on the screen of the tube 12 is directed by a mirror 13 and a second mirror 14 through an optical system including lenses 15 and 16 upon a photo-electric cell 17 which is preferably of the electron multiplier type. The mirrors 13 and 14 may be galvanometer mirrors for example. In the path of the light between the lenses 16 and the cell 17 is arranged a member 23 bearing a representation of a symbol which is to be used as an indicating mark to identify a particular radar indication, such for instance as the indication of an aircraft. The symbol may have any desired form, such for instance as a numeral, letter or design. The symbol may be made transparent upon an opaque background or the reverse arrangement may be used in which the symbol is opaque and the background transparent. The mirror 13 is mounted upon the shaft of a motor 18, while the mirror 14 is mounted upon the shaft of a motor 19, these two shafts being mutually perpendicular and both being perpendicular to the axis of the tube 12.

The motors 18 and 19 are so geared that suitable slow movement of the mirrors is produced when they are energised. The mirror 13 shifts the axis of the optical system and serves to select the zone from which light is picked up in a direction perpendicular to the plane of the paper and the mirror 14 shifts the axis of the optical system and serves to perform the same function in the plane of the paper. The circuit shown in Figure 2 may be used for controlling the motors 18 and 19. This circuit comprises a potential divider 20 and two batteries 21 and 22 connected as shown. When the potential divider is tapped centrally, no E. M. F. appears across the terminals of the motor 18 and rotation of the motor in either direction is produced as desired by moving the potential divider contact in one direction or the other from the mid-position.

Whenever the cathode ray beam in the tube 12 passes over the small zone from which light selected by the mirrors 13 and 14 passes over the transparent parts of the symbol 23, light passes to the photo-electric cell 17. In this way the current developed in the photo-electric cell 17 is representative of the symbol on the member 23. The voltage from the cell 17 is amplified in an amplifier 24 and applied in appropriate sense to a control electrode of the P. P. I. tube 10 to control the intensity of the cathode ray beam in that tube. The region of the screen of the tube 10 in which an image of the symbol appears is dependent upon the zone of the screen of the tube 12 from which light is taken by the mirrors 13 and 14 to scan the symbol 23. Consequently by adjusting the positions of the mirrors 13 and 14, it can be arranged that the identifying symbol appears alongside of the radar indication which this symbol is required to identify on the screen of the tube 10. In Figure 1, immediately above tube 10, is shown a plan view of the screen 25 of the tube 10 in which 26 represents the indication of say an aircraft and at 27 is shown an identifying symbol applied to identify the indication 26. In this case the symbol is shown as the numeral "1." By suitable adjustment of the speed and direction of rotation of the motors 18 and 19 it may be arranged that the indicating symbol moves across the screen 25 alongside of the indication 26 so long as the indication follows a rectilinear path.

In Figure 1 there is shown a second optical system whereby a second indication upon the screen of the tube 10 can be produced. This second optical system is identical with that already described and its elements are therefore given the same references with a dash superscript. Separate potentiometers are provided for adjusting the speed of the motors 18, 18', 19 and 19' and one photo-electric cell 17 serves for both optical systems. If the symbol "2" is arranged at 23', there may be produced on the screen 25 of the tube 10 an identifying symbol 28, namely the numeral 2, to identify an indication 29 produced by a further moving body such as an aircraft. Additional optical systems similar to those described may be provided to co-operate with the same photo-cell 17 and permit the provision of identifying symbols or other markings upon the screen 25. These additional optical systems may be disposed around the axis of the tube 12. For instance, two further optical systems may be disposed above and below the plane of the paper in Figure 1, symmetrically with respect to the optical system shown. In this way, a symbol 30, shown as the numeral "3," may be provided to identify an indication 31 and a symbol 32, shown as the numeral "4," may be applied to identify a further indication 33.

Even when the indications such as 26, 29, etc. on the screen 25 do not follow rectilinear paths, the arrangement described will often be all that is required to assist identification. Thus, occasional adjustment of the potential dividers may be made to correct any deviation of the identifying symbols from the indication which they identify. If more accurate following of non-rectilinear paths is required, use may be made of other devices, such for example as those known as automatic follower devices.

The arrangement according to the invention which has been described may be combined with a system known as video-mapping whereby there can be produced upon the screen of the tube 10 a map showing stationary objects such as beacons, glide paths, reference lines and bearings and the like. For this purpose a suitable map having opaque markings upon a transparent base may be arranged as shown at 34 over the screen of the tube 12. As light from the beam of this tube scans the map, the light is collected by a photo-electric cell 35, the voltage from which is amplified at 36 and fed, in addition to the other voltages, to a control electrode of the tube 10. In this way various markings such as are shown at 37 on the screen 25 may be produced.

A light-proof hood 38 may be provided to enclose the screen of the tube 12 and the optical systems. Screens such as 39 and 40 may be provided to prevent undesired light from reaching the photo-cell 17.

In an arrangement such as that shown in Figure 1, adapted to provide any four different identifying symbols, there is preferably provided a single control panel carrying the control for the eight potentiometers which are needed to control the motors.

It is to be understood that the area of the zone from which light is picked up by the mirrors 13 and 14 may be, and preferably is, considerably smaller than the area of the symbol 23. The size of the symbol representation produced on the screen 25 is determined by the size of the zone on the screen of the tube 12 from which light passes to scan the symbol 23 and the relative scanning amplitude in the two tubes 10 and 12. By a suitable design of the lenses 15, 16 the size of the area scanned at 23 can be made as large as may be convenient in comparison with the size of the said zone upon the screen of the tube 12. Thus, if $f_1$ and $f_2$ are the focal lengths of the lenses 15 and 16 respectively, if the length of a ray path from the screen of the tube 12 to the lens 15 is $a$ and the distance from the lens 16 to the plane of the member 23 is $b$, then the ratio of the length $L_1$ of a strip upon the screen of the tube 12 to the length $L_2$ of the image of this strip produced in the plane 23 is given approximately by $L_2/L_1 = bf_1/af_2$, provided that the distance between the lenses 15 and 16 is small compared with $a$ and $b$. Thus in order to make $L_2/L_1$ greater than unity, since $a$ is greater than $b$, it is necessary that the lens 16 should have a focal distance which is short compared with that of the lens 15. Other optical arrangements may, however, be employed.

Whether a negative or positive image of the symbol at 23 is produced upon the screen of the tube 10 can of course be determined by the sense of the voltage applied from the amplifier 24 to the tube 10 and by the electrode of the tube to which the voltage is applied.

According to a feature of the invention, there is provided, in addition to an identification symbol, an indication of the direction in which the indication identified by the symbol is moving across the screen of the tube 10, assuming that the following is correct. An arrangement for this purpose is shown in Figure 3 in which like parts to those in Figures 1 and 2 have the same reference and parts which are distinct from those in Figures 1 and 2 but perform a like function have the same reference with a double dash superscript. A compass needle is mounted upon a disc 41 which may, for example, be opaque and apertured in the shape of an arrow-head and which is disposed in the field of two pairs of magnetising coils 42 and 43, disposed with their axes perpendicular to one another. The inverse arrangement using a transparent disc with an opaque arrow-head may be used if preferred. The terminals 44 are connected to the terminals of the motor 18'' and the terminals 45 are connected to the terminals of the motor 19'' of Figures 1 and 2. Motors 18'' and 19'' are so constructed that their speeds are substantially proportional to the voltage across their terminals and the voltages across the terminals of the motors will therefore be proportional to the "X" and "Y" components of the speed of movement of the symbol over the screen 25 of the tube 10. Consequently the current in the coils 42 and 43 will generate a magnetic field whose resultant represents the relative speeds of the two motors, and hence the direction of movement of the symbol. The compass needle sets itself along this magnetic field and so orients the arrow-mark thereof. This mark is scanned in the same way as has been described in connection with the symbol shown at 23 in Figure 1 and a corresponding representation of the arrow is therefore produced on the screen of the tube 10. In this way it can be arranged that a combined arrow-head and numerical symbol as shown at $a$ in Figure 4 is produced on the screen 25. If desired, the symbol itself may be provided in addition to the arrow on the disc 41, in which case the representation appearing on the screen 25 may be as shown at $b$ in Figure 4, for example.

I claim:

1. Radar apparatus comprising a main cathode ray tube on the screen of which the radar representation is to appear, an auxiliary cathode ray tube, means for deflecting the cathode ray beams in the two tubes in synchronism with one another to scan the screens of the respective tubes, means to support a representation of a symbol the image of which is to constitute an identification mark, an optical system for directing light from a zone of the screen of the auxiliary tube, which zone has an area which is a small fraction of the total area of the screen of the auxiliary tube, upon said representation to scan this representation, a photo-electric cell disposed to collect light resulting from said scanning, means to apply voltage derived from said cell to modulate the intensity of the beam in said main tube, and means to adjust the position of said zone from which the scanning light is derived.

2. Radar apparatus comprising a main cathode ray tube on the screen of which the radar representation is to appear, an auxiliary cathode ray tube, means for deflecting the cathode ray beams in the two tubes in synchronism with one another to scan the screens of the respective tubes, means to support a representation of a symbol the image of which is to constitute an identification mark, an optical system for directing light from a zone of the screen of the auxiliary tube, which zone has an area which is a small fraction of the total area of the screen of the auxiliary tube, upon said representation to scan this representation, said optical system including two mirrors rotatable about mutually inclined axes and located to effect successive reflections of light passing from the screen of said auxiliary tube to said representation, a photo-electric cell disposed to collect light resulting from said scanning, means to apply voltage derived from said cell to modulate the intensity of the beam in said main tube, and means to rotate said mirrors independently of one another.

3. Radar apparatus comprising a main cathode ray tube on the screen of which the radar representation is to appear, an auxiliary cathode ray tube, means for deflecting the cathode ray beams in the two tubes in synchronism with one another to scan the screens of the respective tubes, means to support a representation of a symbol the image of which is to constitute an identification mark, an optical system for directing light from a zone of the screen of the auxiliary tube which zone has an area which is a small fraction of the total area of the screen of the auxiliary tube upon said representation to scan this representation, said optical system including two mirrors rotatable about mutually inclined axes and located to effect successive reflections of light passing from the screen of said auxiliary tube to said representation, a photo-electric cell disposed to collect light resulting from said scanning, means to apply voltage derived from said cell to modulate the intensity of the beam in said main tube, electromagnetic means to rotate each of said mirrors, and control means associated with each of said electromagnetic means to adjust the speed of said rotation.

4. Radar apparatus comprising a main cathode ray tube on the screen of which the radar representation is to appear, an auxiliary cathode ray tube, means for deflecting the cathode ray beams in the two tubes in synchronism with one another to scan the screens of the respective tubes, means to support a representation of a symbol the image of which is to constitute an identification mark, an optical system for directing light from a zone of the screen of the auxiliary tube, which zone has an area which is a small fraction of the total area of the screen of the auxiliary tube, upon said representation to scan this representation, said optical system including two mirrors rotatable about mutually inclined axes and located to effect successive reflections of light passing from the screen of said auxiliary tube to said representation, a photo-electric cell disposed to collect light resulting from said scanning, means to apply voltage derived from said cell to modulate the intensity of the beam in said main tube, an electric motor to rotate each of said mirrors, and control means to adjust the speed and direction of rotation of each of said motors independently.

5. Radar apparatus comprising a main cathode ray tube on the screen of which the radar representation is to appear, an auxiliary cathode ray tube, means for deflecting the cathode ray beams in the two tubes in synchronism with one another to scan the screens of the respective tubes, rotatable means to support a representation of a symbol the image of which is to constitute an identification mark, an optical system for directing light from a zone of the screen of the auxiliary tube, which zone has an area which is a small fraction of the total area of the screen of the auxiliary tube, upon said representation to scan this representation, a photo-electric cell disposed to collect light resulting from said scanning, means to apply voltage derived from said cell to modulate the intensity of the beam in said main tube, to produce on the screen of the main tube an image of said representation, means to move said image over the screen of said main tube, means to derive voltages representative of the rates of movement of said image in two different coordinates, means to apply said voltages to develop magnetic fields, and means in said magnetic fields to rotate said rotatable means substantially into a direction corresponding to that of said movement.

6. Radar apparatus comprising a main cathode ray tube on the screen of which the radar representation is to appear, an auxiliary cathode ray tube, means for deflecting the cathode ray beams in the two tubes in synchronism with one another to scan the screens of the respective tubes, rotatable means to support a representation of a symbol the image of which is to constitute an identification mark, an optical system for directing light from a zone of the screen of the auxiliary tube, which zone has an area which is a small fraction of the total area of the screen of the auxiliary tube, upon said representation to scan this representation, a photo-electric cell disposed to collect light resulting from said scanning, means to apply voltage derived from said cell to modulate the intensity of the beam in said tube, to produce on the screen of this tube, an image of said representation, at least two optical devices forming part of said optical system located in the light path between the screen of said auxiliary tube and said representation and rotatable about mutually inclined axes, an electric motor to rotate each of said devices to vary the position of said zone and thereby to vary the position of said image upon the screen of said main tube, means to apply voltages across said motors to develop magnetic fields inclined relatively to one another at substantially the same angle as said axes, and means in said magnetic fields to rotate said rotatable means into a direction corresponding to the resultant of said magnetic fields.

7. Radar apparatus according to claim 1 wherein said means to adjust the position of the zone from which the scanning light is derived comprises means for shifting the optical axis of said optical system along two mutually inclined axes.

8. Radar apparatus comprising a main cathode ray tube on the screen of which the radar representation is to appear, an auxiliary cathode ray tube, means for deflecting the cathode ray beams in the two tubes in synchronism with one another to scan the screens of the respective tubes, rotatable means to support a representation of a symbol the image of which is to constitute an identification mark, an optical system for directing light from a zone of the screen of the auxiliary tube, which zone has an area which is a small fraction of the total area of the screen of the auxiliary tube, upon said representation to scan this representation, a photo-electric cell disposed to collect light resulting from said scanning, means to apply voltage derived from said cell to modulate the intensity of the beam in said main tube, to produce on the screen of the main tube an image of said representation, means including a variable speed electric motor for shifting the axis of said optical system parallel to a given axis, means including a second variable speed electric motor to shift the axis of said optical system parallel with a second axis mutually inclined with respect to said given axis, a source of voltage of variable magnitude and reversible in direction for energizing each of said motors, means to develop superimposed magnetic fields oriented according to the two directions of movement of said optical axis and having directions and magnitudes determined by the energizing voltages applied to said motors, and means in said magnetic fields to rotate said rotatable means substantially into the direction corresponding to the resultant of said magnetic fields.

BRIAN CLIFFORD FLEMING-WILLIAMS.

REFERENCES CITED

The following references are of record in the file of this patent:

UNITED STATES PATENTS

| Number | Name | Date |
| --- | --- | --- |
| 2,406,751 | Emerson | Sept. 3, 1946 |
| 2,506,127 | Allen | May 2, 1950 |
| 2,522,528 | McNally | Sept. 19, 1950 |

FOREIGN PATENTS

| Number | Country | Date |
| --- | --- | --- |
| 614,595 | Great Britain | Dec. 17, 1948 |